March 12, 1963  K. R. WILKERSON  3,080,902
PRODUCE CENTERING ARRANGEMENT
Filed Oct. 7, 1960  2 Sheets-Sheet 1
Fig.1.
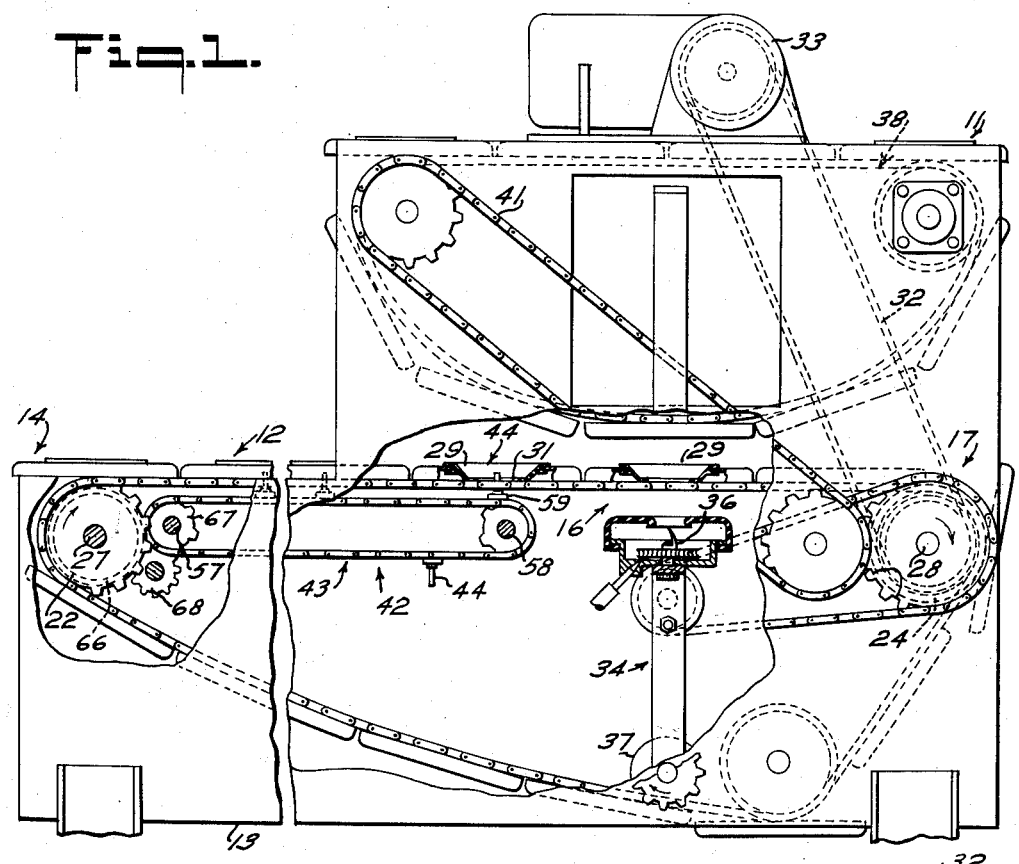
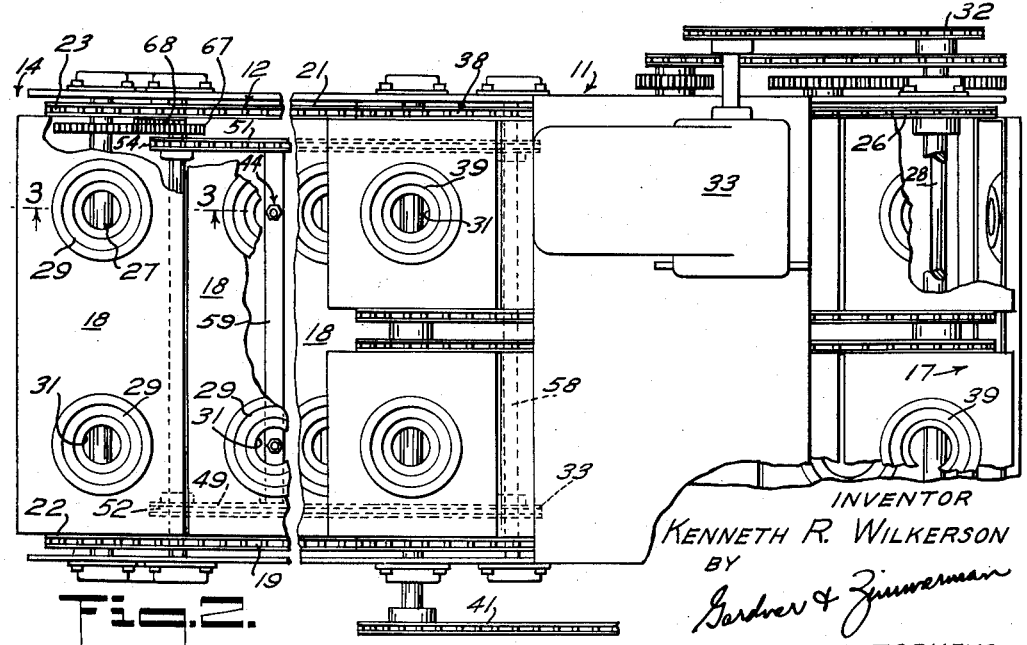
Fig.2.
INVENTOR
KENNETH R. WILKERSON
BY
Gardner & Zimmerman
ATTORNEYS

United States Patent Office 3,080,902
Patented Mar. 12, 1963

3,080,902
PRODUCE CENTERING ARRANGEMENT
Kenneth R. Wilkerson, Martinez, Calif., assignor of one-half to Sidney Ross, Walnut Creek, Calif.
Filed Oct. 7, 1960, Ser. No. 61,163
4 Claims. (Cl. 146—52)

This invention relates to conveyor type produce coring machines in general, and is particularly directed to an arrangement for manipulating produce in the conveyor receiving pockets of these machines in such a manner that the cores of the produce are centered with the axes of the pockets prior to conveyance to the coring station for engagement thereat by coring means operable along the pocket axes.

Various conveyor type produce coring machines are widely employed in the canning industry to substantially automatically core a large conveyor throughput of tomatoes, bell peppers, peaches, and other produce. Commonly these coring machines include a continuous belt or loop type conveyor which transports the produce in a substantially continuous manner from a loading station to a coring station whereat coring knives or the like are operable to remove the cores from the produce, the conveyor then transporting the cored produce to a collecting station. In the accomplishment of the foregoing the conveyor commonly is provided with rows of receiving pockets successively aligned in the direction of conveyor traverse. As the rows of pockets pass the loading station the produce is manually placed in the pockets and is thereafter pulled to the coring station. As each row of pockets reaches the coring station the coring knives thereat move to penetrate the produce carried in the pockets at points which intersect the pocket axes. The coring knives then operate to remove a core segment from the produce which is coaxial with the pocket axes. One coring machine of the foregoing type is disclosed in my copending application Serial No. 822,141, filed June 22, 1959, now Patent No. 3,036,612.

It will be appreciated that in order for the cores to be effectively removed from the produce by the action of the coring knives in machines of the previously noted variety it is necessary that the cores be centered with respect to the axes of the conveyor pockets. Unfortunately in most produce, for example, tomatoes, the core is commonly somewhat offset from the axis of symmetry of the produce. Therefore when the produce are centered in the conveyor pockets to assume natural rest positions wherein the axes of symmetry of the produce are aligned with the axes of the pockets, the cores are in most instances offset therefrom. With the produce thus positioned the action of the coring knives is ineffective in that useable portions of the produce may be removed while portions of the cores are left behind. Of course, this difficulty may be obviated by manually centering the produce cores with the pocket axes. Such manipulation however must be carefully accomplished and is therefore time consuming with a resultant material reduction in the throughput of the machine.

It is therefore a primary object of the present invention to provide a centering arrangement in a conveyor system for automatically centering the cores of produce with respect to the axes of the produce receiving pockets thereof.

Another object of the invention is the provision of centering means in a continuous conveyor coring machine which insures removal of the entire cores from produce by coring knife means operable to penetrate the produce at points of intersection with the axes of the produce carrying pockets of the conveyor.

It is still another object of the invention to provide centering means of the class described which is readily adjustable to function with a variety of different produce.

A further object of the invention is to provide a produce centering arrangement of the class described which is extremely simple and economical in construction and readily adaptable to use with existing conveyor systems.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a side elevational view of an embodiment of the present invention with portions of the superstructure broken away to more clearly illustrate the structure of the apparatus.

FIGURE 2 is a top plan view of the device as shown in FIGURE 1 with portions of the superstructure being broken away.

Figure 3:
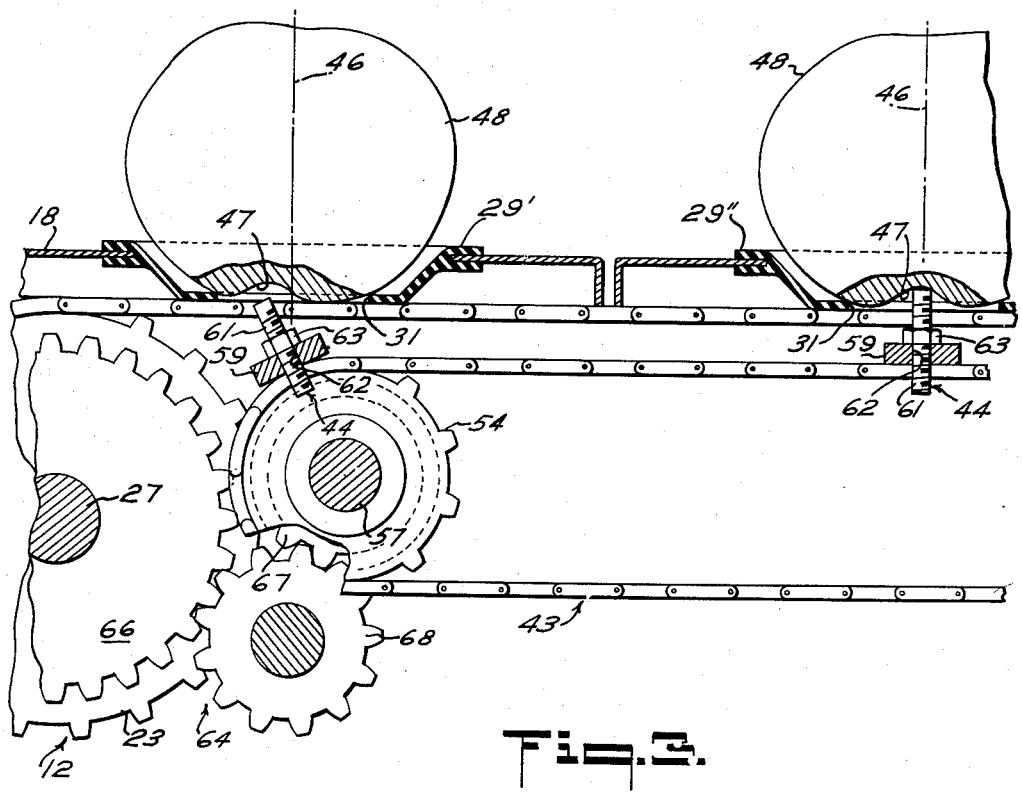
FIGURE 3 is an enlarged cross-sectional view taken substantially on the line 3—3 of FIGURE 2.

In the following description the produce centering arrangement of the present invention is described with particular reference to the coring machine disclosed in my previously referenced copending application Serial No. 822,141. However, it is to be understood that the invention is not limited to such employment, the centering arrangement being adaptable to use with any conveyor system and for any application wherein centering of the core of the produce with respect to the axes of the produce carrying pockets of a conveyor is desired.

Referring now to the drawings, particularly FIGURES 1 and 2, there is shown a continuous conveyor coring machine 11 of the general type disclosed in the previously referenced copending application. Basically the machine includes a continuous loop conveyor 12 operable in a mounting superstructure 13 to convey produce longitudinally from a loading station at one end and indicated generally at 14, through a coring station indicated generally at 16, and to a receiving station at the other end of the conveyor and indicated generally at 17. The conveyor includes, for example, longitudinally spaced plates 18 which extend transversely between endless loop link chains 19, 21 engaging pairs of sprockets 22, 23 and 24, 26 secured to rotatable shafts 27 and 28 at the opposite ends of the superstructure. Each plate 18 has a row of open-topped, cup-shaped produce receiving pockets 29 mounted in upright position thereon, the corresponding pockets of successive plates being in longitudinal alignment. The pockets are of a resilient material such that produce placed therein at the loading station 14 will not be crushed or bruised, and the pockets are provided with central apertures 31 in their bases to permit passage of coring means subsequently described into engagement with the produce carried in the pockets. The conveyor is driven in such a manner that its upper reach continuously proceeds from the loading station to the receiving station. This is accomplished as by means of a chain and sprocket drive 32 operatively coupled between a motor 33 and, for example, the sprocket shaft 28.

At the coring station 16 there is provided suitable coring means 34 which are arranged to remove the cores of produce carried in the pockets 29 as each row of pockets pass the coring station. The coring means 34 includes a plurality of transversely spaced rotary driven coring knives 36 which as illustrated are mounted for unitary movement from a retracted position beneath to a coring position above the upper reach of the conveyor. The knives are driven as by means of a gear and cam drive 37 or the like coupling the knives to the motor 33 and suitably arranged to move the knives between their retracted and coring positions in synchronism with movement of the conveyor. More specifically the movement is synchronized such that the knives enter the pocket apertures 31 along the vertical axes of the pockets as each row of pockets arrives at the coring station. The knives thus penetrate the produce in the pockets at points of their seated surfaces intersected by the pocket axes. In some instances the upward thrust of the coring knives is such as to undesirably lift the produce in the pockets. Therefore in some coring machines, such as that illustrated, a second conveyor 38 overlying the main conveyor 12 in the region of the coring station is provided to prevent upward movement of the produce in the cups during the coring operation. To this end, the conveyor 38 may be provided for example as being similar in construction to the main conveyor and having a plurality of rows of pockets 39 arranged in like fashion as the pockets 29. The conveyor 38 is driven from motor 33 and its movement appropriately synchronized to that of the conveyor 12 as by means of a chain and sprocket drive 41. The drive is arranged such that the rows of pockets 39 are aligned with and closely spaced from the rows of pockets 29 at the instant the coring knives thrust upward. Produce carried in the pockets 29 are hence held against upward movement by the pockets 39 during the coring operation.

Inasmuch as the coring knives 36 are operable to engage produce along the pocket axes, the produce must be disposed in the pockets with their calyxes centered with the axes if an effective coring operation is to be accomplished. As noted previously this may be accomplished manually but only at the expense of a reduced machine throughput. Therefore, in accordance with the salient aspects of the present invention, a centering device is provided which automatically aligns the calyxes of produce placed in the pockets of a conveyor, e.g., pockets 29, with the pocket axes. Coring knives traversing the centers of the pocket apertures consequently engage the produce at their calyxes whereby wedges concentrically disposed relative to the calyxes and including the cores are removed.

Considering now more specifically the unique centering arrangement in accordance with the present invention, the centering means as employed in the conveyor coring machine 11 is depicted by the numeral 42. Broadly, the centering means comprises a continuous loop 43 having an upper reach disposed in close parallel spaced relation to the upper reach of the main conveyor 12 with the longitudinal extent of the loop being intermediate the loading and coring stations 14 and 16. A plurality of centering fingers 44 are rigidly secured in normal relation to the surface of the loop 43 and these fingers are positioned and spaced to correspond to the axes of the conveyor pockets 29. The fingers are of such a length that when the loop is arranged to underlie the upper reach of the main conveyor the ends of the fingers project a short distance through the apertures 31 in the bases of the pockets 29 during the time the fingers traverse the upper reach of the loop. The curved end portion of the loop where the transition between the lower and upper reaches occurs is disposed beneath a substantially horizontal portion of the upper reach of the main conveyor immediately following the loading station. In addition, the loop is arranged to be driven at the same rate of travel as the main conveyor and is synchronized therewith such that the fingers are centered with the axes of the pockets 29 during finger traversal of the upper reach of the loop.

With the foregoing arrangement of the centering means 42, it is to be noted, as best illustrated in FIGURE 3, that produce placed in the pockets 29 at the loading station with their calyxes offset from the pocket axes in a contra direction to conveyor movement are automatically centered by means of the fingers 44, prior to arrival at the coring station 16. More specifically, by virtue of the curved transition portion of the loop 43 underlying the main conveyor in a substantially horizontal region thereof, the fingers during their movement around the transition portion initially enter the pocket apertures with an inclination to the vertical and their ends offset from the pocket axes in a contra direction to conveyor travel. This is depicted for the pocket 29' of FIGURE 3, the center line 46 denoting the axis of the pocket. The calyx 47 of produce 48 carried in the pocket will be seen to be offset from the axis 46 and engaged by the inclined finger projecting through the pocket aperture. As the fingers progress around the transition portion of the loop in approaching its upper reach, the inclination of the fingers from vertical gradually diminishes and they approach alignment with the pocket axes. The ends of the fingers thus sweep from their initially offset positions near the distal side regions of the pocket apertures relative to conveyor travel to positions aligned with the pocket axes at the beginning of the upper reach of the loop. In sweeping from the sides of the pocket apertures to the pocket axes, the fingers in their engagements with the calyxes urge the produce to correspondingly centered positions. This is depicted for the pockets 29" of FIGURE 3 where the produce 48 is shown to be now appropriately positioned within the pocket, its calyx 47 centered with the pocket axis 46 and engaged by the corresponding finger in vertical alignment with the axis. The fingers then progress along the upper reach of the loop in continuous vertical alignment with the pocket axes and in engagement with the centered produce calyxes. At the end of the upper reach of the loop and prior to the coring station, the fingers move out of engagement with the produce calyxes in traversing the transition portion of the loop to its lower reach. The produce are thus appropriately centered in the pockets 29 and prepared to receive the coring knives 36 operable along the pocket axes. Where a second holding conveyor such as conveyor 38 is utilized, the loop 43 is preferably terminated at substantially the start of the holding conveyor. The produce are then retained in centered positions in the pockets 29 by the holding conveyor pockets 39 immediately after the centering fingers have moved out of engagement with the produce.

Considering now the preferred structure of the centering means 42, the loop 43 is best provided as a pair of transversely spaced continuous link chains 49 and 51 respectively engaging pairs of sprockets 52, 53 and 54, 56. The sprockets 52, 54 and 53, 56 are secured in transversely spaced relation to axles 57 and 58 journalled for rotation in the superstructure 13 beneath the upper reach of conveyor 12 at positions respectively spaced longitudinally to the right of the main conveyor axle 27 and to the left of the coring means 34 as viewed in FIGURES 1 and 3, the position of axle 58 preferably being substantially vertically beneath the rearward sprockets of the upper conveyor 38.

Between the chains 49, 51 there are preferably provided a plurality of longitudinally spaced plates 59 for mounting the centering fingers 44. The spacing between the center lines of adjacent plates 59 is equal that between the center lines of the main conveyor plates 18. The fingers 44 are then secured to the plates 59 in transversely spaced relation along their center lines, the positions of the fingers corresponding to the centers of the pockets 29 in the respective plates 18. The fingers 44 will thereby project through the centers of the base apertures 31 in the pockets 29 when the travel of the loop is synchronized with the conveyor travel. It will be appreciated that the average depth of the calyxes of different types and sizes of produce that may be carried in the pockets 29 may vary considerably. Accordingly an amount of projection of the fingers above the bases of the pockets that may be suitable for one size or variety of produce will not be suitable for others. Therefore, it is preferable that the fingers 44 be adjustable in length in their securance to the loop plates 59. To this end the fingers are preferably provided as threaded rods 61 threadably engaging tapped bores 62 in the plates (see FIGURE 3). The rods may be screwed into the bores to a variety of depths and secured in position by means of nuts 63 threaded upon the rods and tightened against the surfaces of the plates. The lengths of the fingers above the plates may thus be readily adjusted in this manner to accommodate a variety of calyx depths.

Synchronous driving of the loop 43 relative to conveyor 12 may be accomplished by a variety of means well known in the art. For example, the loop may be driven from the main conveyor drive axle 27 by a direct gear drive 64 as depicted in the drawings. The drive preferably comprises spur gears 66, 67 respectively secured to axles 27, 57 and engaged by an idler gear 68 journalled to the superstructure 13. The ratio of gears 66, 67, 68 is selected such that the rate of travel of the loop 43 is equal to that of the conveyor 12, the gears then providing a locked in movement of the loop in synchronism with the conveyor.

By the present invention there is thus provided a simple arrangement which may be readily incorporated in a conveyor system to automatically center produce in receiving pockets of the conveyor with the calyxes of the produce in alignment with the pocket axes. By merely placing the produce in the pockets in positions wherein the calyxes are offset in contra directions to the direction of conveyor travel, the arrangement automatically centers the produce in an appropriate manner for the subsequent accomplishment of coring or other operations which it may be desired to perform on the produce.

What is claimed is:

1. In a conveyor system including a continuous loop conveyor operable in a superstructure and having a plurality of receiving pockets for carrying produce along its upper reach from a loading station at one end thereof through an intermediate coring station to a receiving station at the opposite end, said pockets being open topped and having central apertures in their bases, the combination comprising an endless belt mounted upon said superstructure having an upper reach closely spaced beneath the upper reach of said conveyor and extending from a position following the loading station to a position short of the coring station, the curved transition portion between the lower and upper reaches of the belt being disposed to underlie a horizontal portion of the upper reach of the conveyor in the region of the loading station, a plurality of fingers projecting normally from the surface of said belt and positioned to correspond with the axes of the pockets of said conveyor, said fingers of a length to project from the transition portion of the belt through the apertures into said pockets at positions offset from the aperture axes and to project from the upper reach of the belt upwardly through the apertures of said pockets along their axes, and means for driving said conveyor and belt in synchronism to maintain the fingers in constant alignment with the pocket axes over the upper reach of the belt.

2. The combination of claim 1, further defined by said fingers being adjustable in length.

3. In combination with a conveyor system including a continuous loop conveyor operable in a superstructure and having a plurality of receiving pockets for carrying produce along its upper reach from a loading station at one end thereof through an intermediate coring station to a receiving station at the opposite end, said pockets being open topped and having central apertures in their bases, said system further including a second continuous loop conveyor operable in said superstructure to overlie the first conveyor in the region of said coring station, said second conveyor having a plurality of holding pockets arranged to oppose the receiving pockets of the first conveyor at said coring station to limit upward travel of the produce in the receiving pockets, produce centering means comprising an endless belt mounted upon said superstructure and having an upper reach closely spaced beneath the upper reach of said first conveyor and extending from a position following the loading station to a position underlying the upper to lower reach transition of said second conveyor, the curved transition portion between the lower and upper reaches of the belt disposed to underlie a horizontal portion of the upper reach of the first conveyor in the region of the loading station, a plurality of fingers projecting normally from the surface of said belt and positioned to correspond with the axes of the receiving pockets of said first conveyor, said fingers of a length to enter and project into said pockets from the lower to upper reach transition portion of the belt through the apertures of said receiving pockets at positions offset from their axes in a contra direction to the travel of the first conveyor and to project upwardly from the upper reach of the belt through the apertures of said receiving pockets along their axes, and means for driving said belt in synchronism with said first conveyor to maintain the fingers in constant alignment with the pocket axes over the upper reach of the belt.

4. In combination with a horizontal continuous loop conveyor having a plurality of receiving pockets for conveying produce along its upper reach, said pockets being open topped and having apertures in their bases coaxially aligned with the pocket axes, a produce centering arrangement comprising a continuous loop having an upper horizontal portion in closely spaced underlying parallelism with the upper reach of said conveyor, a lower horizontal portion, and interconnecting curved end portions between the horizontal portions, said end portions underlying the upper reach of said conveyor, a plurality of fingers projecting normally from the surface of said loop and positioned to correspond to the axes of said pockets, said fingers of a length to project from said curved end portions through the apertures in the bases of said pockets into said pockets at positions offset from their axes and to project from said upper horizontal portion of said loop upwardly through said apertures along the axes of said pockets, and means for driving said conveyor and loop in synchronism to maintain said fingers in constant alignment with the pocket axes over said upper horizontal portion of said loop.

References Cited in the file of this patent

UNITED STATES PATENTS

| | | |
|---|---|---|
| 2,293,121 | Dudley | Aug. 18, 1942 |
| 2,387,709 | Ashlock | Oct. 30, 1945 |
| 2,406,311 | Ashlock | Aug. 27, 1946 |
| 2,742,066 | Carroll | Apr. 17, 1956 |